United States Patent [19]

Hale

[11] Patent Number: 4,484,442
[45] Date of Patent: Nov. 27, 1984

[54] EXHAUST SYSTEM FOR FOUR CYLINDER TWO-CYCLE ENGINES

[75] Inventor: David J. Hale, Pickett, Wis.

[73] Assignee: Brunswick Corporation, Skokie, Ill.

[21] Appl. No.: 502,402

[22] Filed: Jun. 8, 1983

[51] Int. Cl.³ .......................... F01N 7/08; F02B 27/02
[52] U.S. Cl. ......................................... 60/313; 60/314
[58] Field of Search ........................... 60/312, 313, 314

[56] References Cited

U.S. PATENT DOCUMENTS

| | | | |
|---|---|---|---|
| 2,643,510 | 6/1953 | Kiekhaefer | 60/313 |
| 3,695,238 | 10/1972 | Boerma | 60/313 |
| 3,772,887 | 11/1973 | Ziegler | 60/313 |
| 4,381,644 | 5/1983 | Kusche | 60/313 |

FOREIGN PATENT DOCUMENTS 886556  7/1943  France ................................. 60/313

Primary Examiner—Douglas Hart
Attorney, Agent, or Firm—O. T. Sessions

[57] ABSTRACT

A four cylinder, two-cycle engine (10) has an exhaust system formed in a die-cast cylinder block. The exhaust system includes four legs (25) connected to the exhaust ports (23) of the cylinders (12). The upper two legs join together, as do the lower two legs to form two exhaust branches (26) connected by an exhaust trunk (27). An exhaust outlet passage (28) connected to the trunk (27) to provide an outlet for exhaust gases. The exhaust system is formed to lie in a plane on the exhaust side of the cylinder block (16).

11 Claims, 5 Drawing Figures

EXHAUST SYSTEM FOR FOUR CYLINDER TWO-CYCLE ENGINES

DESCRIPTION

1. Technical Field

This invention relates to internal combustion engines and particularly to exhaust systems for a four cylinder two-cycle engine.

2. Background Art

In general, it is known to use the pressure waves arising in the exhaust system of multi-cylinder two-cycle engines to assist in scavenging and charging the cylinders. Such systems have been proposed for four cylinder in-line engines, as for example, in U.S. Pat. No. 3,692,006, though the general principles of such exhaust systems are known, prior four cylinder in-line engines requiring compact packaging, such as outboard motors, have not used the tuned systems apparently because of the difficulty of packaging the tuned exhaust system compactly and in a manner allowing the external surfaces of the exhaust system to be water cooled.

DISCLOSURE OF INVENTION

The invention provides a four cylinder, in-line, two-cycle engine having an exhaust system which is both highly efficient in operation, compactly packaged, and readily manufactured.

The engine of the invention includes four cylinders arranged in a vertical bank. Each cylinder has an exhaust port, with all of the exhaust ports placed on the same side of the cylinder bank. An exhaust cavity is formed in the cylinder block on the same side as the exhaust ports and lies generally in a plane parallel to the plane of the cylinder block. This exhaust cavity includes a vertically extending trunk on one side of the exhaust ports, four exhaust legs, each connected to one of the exhaust ports. The two upper legs join together, as do the two lower legs, with their junctions connected by an upper and a lower exhaust branch, respectively, to the exhaust trunk. The exhaust cavity is formed to be open on the side facing away from the cylinder bank, and is closed on that side by an exhaust manifold cover to form an exhaust manifold. The engine thus formed provides an effective exhaust system which occupies a minimum of space along the side of the engine.

Preferably an exhaust outlet is also formed by the exhaust cavity to extend downwardly from the exhaust trunk. An exhaust gas pipe can be attached to the bottom of the cylinder block to receive the exhaust gas from the exhaust outlet.

The invention thus provides a two-cycle, four cylinder engine which has an exhaust system formed substantially by the cylinder block. The exhaust system thus can be readily water cooled and is suitable for such applications as the powerhead of an outboard motor.

BEST MODE FOR CARRYING OUT THE INVENTION

Figure 1:
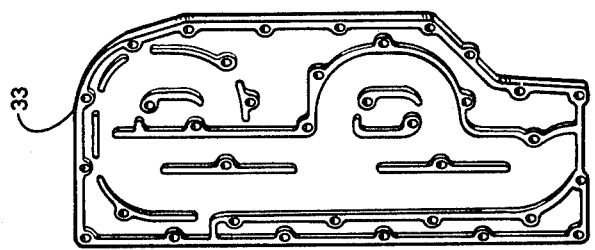
FIG. 1 is an exploded view, partially in section, of an outboard motor incorporating features of the invention.
Figure 1:
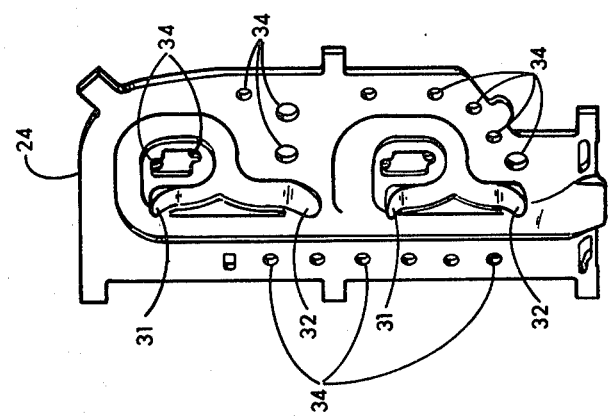
Figure 1:
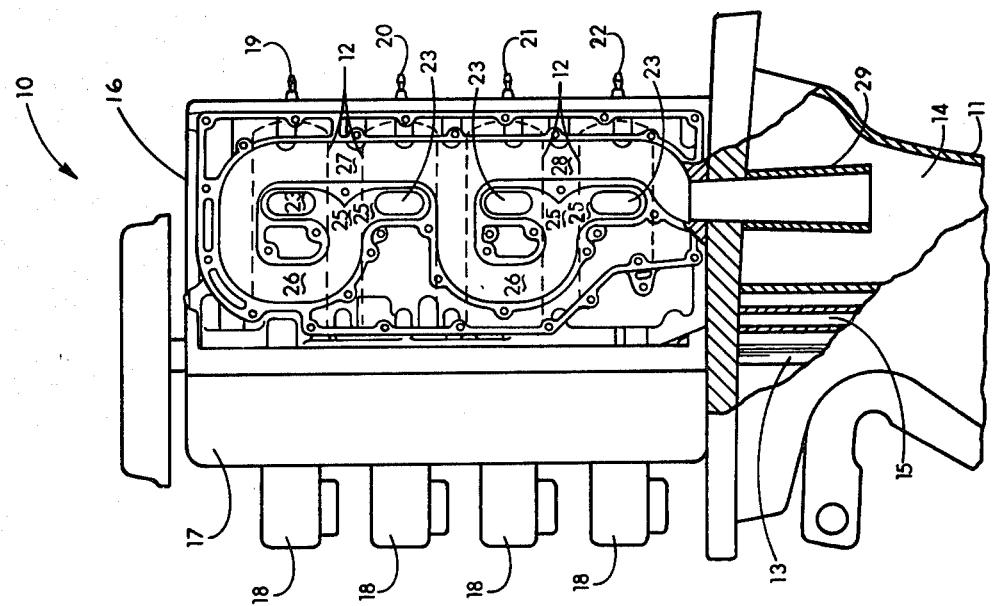
Figures 2, 3:
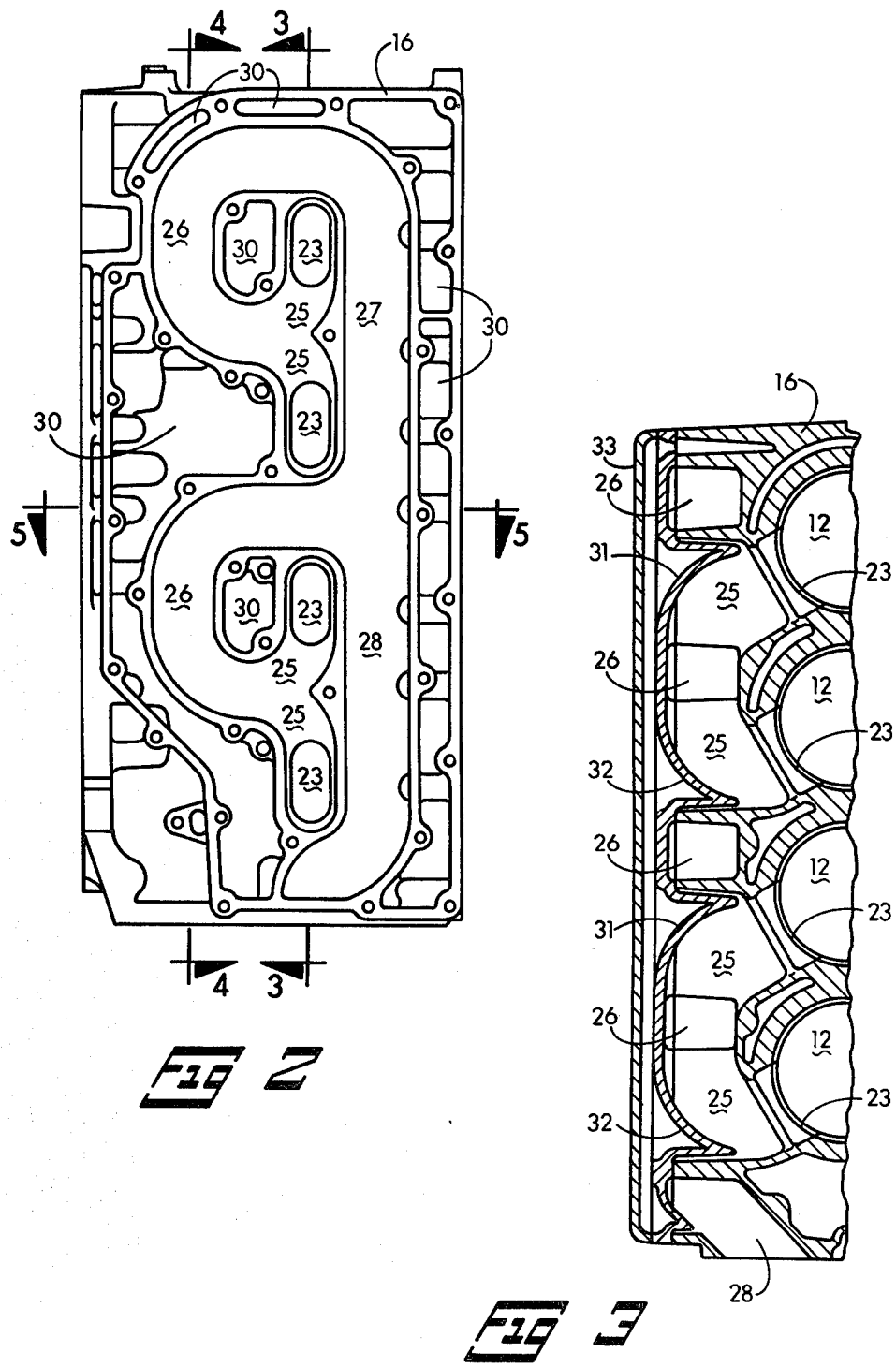
FIG. 2 is a view in elevation of the cylinder block of FIG. 1.
FIG. 3 is a sectional view taken along line 3—3 of FIG. 2 with the exhaust cavity covers in place.
Figure 4:
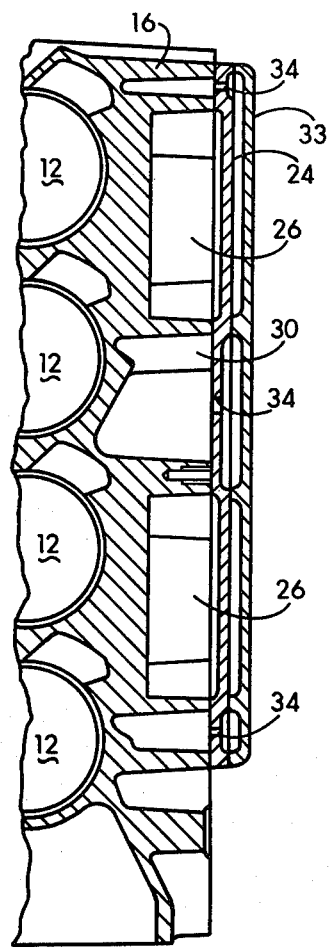
FIG. 4 is a sectional view along line 4—4 of FIG. 2.
Figure 5:
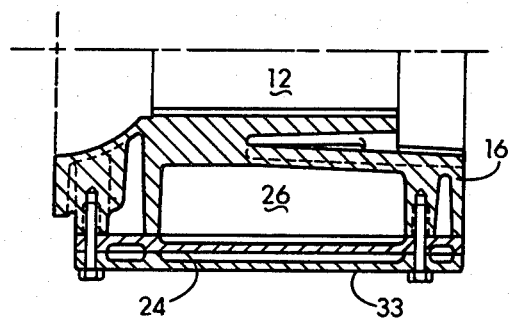
FIG. 5 is a sectional view along line 5—5 of FIG. 2.

Referring to the drawings, a two-cycle, four cylinder, in-line engine 10 supported on the drive shaft housing 11 of an outboard motor is illustrated. The engine 10 has four cylinders 12 arranged in a vertical bank with a piston, not illustrated, mounted in each cylinder 12. The pistons are connected by connecting rods to drive a crankshaft having four crank pins angularly spaced at 90° intervals. The crankshaft is connected by a drive shaft 13 to drive a propeller at the lower end of the drive shaft housing 11. The drive shaft housing 11 also includes an exhaust gas passage 14 for receiving exhaust gases from the engine 10 and discharging them below the surface of the water, preferably through the hub of the propeller, and a water passage 15 for supplying cooling water to the engine.

The engine 10 is a crankcase compression type having a separate crankcase compartment for each cylinder 12 formed by the crankcase end of the cylinder block 16, the intake manifold casting 17, and the crankshaft. The air-fuel charge provided by the carburetors 18 is compressed in the crankcase compartments and transferred to the cylinders 12 by a loop charging system using piston controlled ports to open and close the transfer passages, as is well known in the art. An ignition system, not illustrated, supplies appropriately timed electrical pulses to fire one of the sparkplugs 19, 20, 21, 22 at every 90° of rotation of the crankshaft. The sparkplugs are arranged to fire in the order 19–21–20–22, though for the purposes of the present invention, it would be equally satisfactory to have them fire in the order 19–22–20–21. Following each piston power stroke, an exhaust port 23 in each cylinder wall is opened by the piston to discharge the exhaust gases into the tuned exhaust system formed in the exhaust side of the engine cylinder block 16.

The tuned exhaust system, formed by the cylinder block 16 and the exhaust manifold cover 24, includes four equal length legs 25, one extending from each of the exhaust ports 23. The upper and lower pair of legs 25 each join to form two exhaust branches 26, also of equal length. The two branches 26 are joined by an exhaust trunk 27. Since the engine fires in an order alternating between one of the upper pair of cylinders and one of the lower pair of cylinders, the exhaust pressure pulses arising when an exhaust port 23 is opened will always have the same distance to travel to reach the exhaust port 23 of the cylinder next to be charged. With the engine operating in the design high speed range, the positive pressure pulse arrives at the cylinder being charged just prior to closure of the exhaust port to provide a supercharging effect.

The tuned exhaust system also includes an exhaust outlet passage 28 connected to the lower end of the exhaust trunk 27 and an exhaust pipe 29 extending down from the lower end of the exhaust outlet passage 28 into the drive shaft housing 11. When a positive pressure or compression wave from one of the exhaust ports 23 arrives at the end of the exhaust pipe 29, a negative pressure or rarefaction wave is reflected back up the exhaust pipe 29. The length of the exhaust pipe 29 is designed to cause the rarefaction wave to reach the originating exhaust port when the piston in the corresponding cylinder is approximately at bottom dead center with the engine operating in the design high speed range. The rarefaction wave thus aids in scavenging the cylinder of exhaust gases. Because the exhaust outlet passage 28 connects to the bottom of the exhaust trunk 27, the effective length of the exhaust pipe is greater for the upper pair of cylinders than for the lower pair. Thus the lower cylinders will be optimally tuned at an engine speed somewhat higher than that for the upper cylinders.

The exhaust system is arranged to be substantially defined by a cavity formed in the exhaust side of the die-cast cylinder block 16 with the manifold cover 24 completing the passageways. The cavity includes the upper and lower pair of legs 25, one leg connecting to the exhaust port 23 of each cylinder 12. Each pair of exhaust legs extend out from the exhaust ports 23, merging together and turning toward the forward or crankcase end of the cylinder block to partially form the pair of exhaust branches 26. The exhaust branches 26 turn upward and toward the rear or head end of the cylinder block and are joined by the exhaust 27 trunk extending vertically at the rear of the cylinder block 16. The exhaust outlet 28 connects to the bottom end of the trunk 27 and provides a passage exiting through the bottom of the cylinder block 16. The exhaust branches 26, the exhaust trunk 27, and the exhaust outlet 28 are all substantially the same depth. All of the corners in the system are smoothly rounded to provide an efficient flow path for the exhaust gases. The exhaust cavity is formed by the exhaust side die which is withdrawn in a direction perpendicular to the plane of the cylinders and by the bottom die which is withdrawn downward. Cooling cavities 30, also formed by the exhaust side die, surround the exhaust cavity and fill the loops formed by the exhaust passage to provide water cooling and prevent overheating of any portion of the cylinder block 16.

The exhaust cavity is closed by the exhaust manifold cover 24 attached by bolts to the flat, machined surface on the exhaust side of the cylinder block 16. The manifold cover 24 includes a shallow channel mating with the exhaust cavity in the cylinder block 16 to form the exhaust manifold. Projections 31 and 32 formed on the manifold cover extend into the portions of the cavity forming the four legs 25 of the manifold to smoothly turn the exhaust flow from the exhaust ports 23.

The manifold cover 24 also serves to close the water cooling cavities 30 formed in the cylinder block 16. A water jacket cover 33 is attached on the outside of the manifold cover 24 by the same bolts attaching the manifold cover to the cylinder block 16. A series of holes 34 through the manifold cover provides flow paths for the cooling water to assure water flow over essentially all of the external surfaces of the exhaust manifold.

I claim:

1. A two-cycle, in-line engine comprising:
   (A) a cylinder block having:
   (1) four horizontal cylinders arranged in a vertical bank,
   (2) four vertically spaced exhaust ports in communication with said cylinders on a first side of said bank,
   (3) an exhaust cavity formed generally in a plane parallel to the plane of said cylinder bank and open on said first side of said bank, said exhaust cavity including:
      (a) a vertically extending exhaust trunk on one side of said exhaust ports,
      (b) four exhaust legs, each connected to one of said exhaust ports, the upper two of said legs joining together and the lower two of said legs joining together on the side of said exhaust ports opposite said trunk,
      (c) upper and lower exhaust branches, said upper branch connecting the junction of said upper two legs with said exhaust trunk and said lower branch connecting the junction of said lower two legs with said exhaust trunks, and
   (B) an exhaust manifold cover attached to said cylinder block on said first side to form with said exhaust cavity an exhaust manifold.

2. The engine defined in claim 1 wherein said exhaust legs are all of approximately equal length.

3. The engine defined in claim 2 wherein said upper and lower exhaust branches are equal in length.

4. The engine defined in claim 3 wherein said exhaust cavity further comprises an exhaust outlet passage connected to said exhaust trunk.

5. The engine defined in claim 4 wherein said exhaust outlet passage is connected to the lower end of said exhaust trunk.

6. The engine defined in claim 5 wherein said exhaust outlet passage includes a vertically extending passage aligned with said exhaust trunk.

7. The engine defined in claim 6 wherein said vertically extending passage is open to discharge exhaust gas through the bottom of said cylinder block.

8. The engine defined in claim 7 wherein said exhaust cavity has a generally uniform depth.

9. The engine defined in claim 8 further comprising an exhaust gas pipe attached to the bottom of said cylinder block to receive exhaust gas from said exhaust gas outlet.

10. The engine defined in claim 1 further comprising:
    (C) a water jacket cover attached to said exhaust manifold cover to form a cooling jacket over the external surface of said manifold cover.

11. The engine defined in claim 8 wherein said cylinder block further includes a water cooling passage and said manifold cover includes openings connecting said water passage with said cooling jacket.

* * * * *